US009504982B2

(12) United States Patent
Lipinski et al.

(10) Patent No.: US 9,504,982 B2
(45) Date of Patent: Nov. 29, 2016

(54) THERMOCHEMICAL REACTOR SYSTEMS AND METHODS

(71) Applicant: REGENTS OF THE UNIVERSITY OF MINNESOTA, Minneapolis, MN (US)

(72) Inventors: Wojciech Lipinski, Minneapolis, MN (US); Jane Holloway Davidson, Wayzata, MN (US); Thomas Richard Chase, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 76 days.

(21) Appl. No.: 14/359,802

(22) PCT Filed: Nov. 21, 2012

(86) PCT No.: PCT/US2012/066301

§ 371 (c)(1),
(2) Date: May 21, 2014

(87) PCT Pub. No.: WO2013/119303

PCT Pub. Date: Aug. 15, 2013

(65) Prior Publication Data

US 2015/0044123 A1 Feb. 12, 2015

Related U.S. Application Data

(60) Provisional application No. 61/562,345, filed on Nov. 21, 2011.

(51) Int. Cl.
*B01J 8/10* (2006.01)
*C01B 31/18* (2006.01)

(Continued)

(52) U.S. Cl.
CPC .............. *B01J 19/122* (2013.01); *B01J 8/087* (2013.01); *B01J 8/10* (2013.01); *C01B 3/061* (2013.01);

(Continued)

(58) Field of Classification Search
CPC .............................. C01B 3/063; C01B 3/061
See application file for complete search history.

(56) References Cited

U.S. PATENT DOCUMENTS 4,516,674 A * 5/1985 Firth ..................... B65G 31/04 100/156
5,051,041 A * 9/1991 Firth .................... F04D 23/003 198/617

(Continued)

FOREIGN PATENT DOCUMENTS

RU 2 040 328 C1 7/1995
WO 2009/061795 A1 5/2009
WO 2010/013244 A2 2/2010

OTHER PUBLICATIONS

Centi et al., "Towards solar fuels from water and $CO_2$," *ChemSusChem*, Feb. 22, 2010; 3(2):195-208.

(Continued)

*Primary Examiner* — Matthew Merkling
(74) *Attorney, Agent, or Firm* — Mueting, Raasch & Gebhardt, PA

(57) ABSTRACT

Thermochemical reactor systems that may be used to produce a fuel, and methods of using the thermochemical reactor systems, utilizing a reactive cylindrical element, an optional energy transfer cylindrical element, an inlet gas management system, and an outlet gas management system.

11 Claims, 9 Drawing Sheets

(51) Int. Cl.
*B01J 19/12* (2006.01)
*B01J 8/08* (2006.01)
*C01B 3/06* (2006.01)

(52) U.S. Cl.
CPC ............... *C01B 3/063* (2013.01); *C01B 31/18* (2013.01); *B01J 2208/0007* (2013.01); *B01J 2208/00061* (2013.01); *B01J 2208/00451* (2013.01); *B01J 2208/00513* (2013.01); *B01J 2208/00628* (2013.01); *B01J 2219/1203* (2013.01); *Y02E 60/36* (2013.01)

(56) References Cited

U.S. PATENT DOCUMENTS 5,381,886 A * 1/1995 Hay ........................ F04D 5/001 198/642
2006/0188433 A1 8/2006 Weimer et al.
2012/0171588 A1* 7/2012 Fan ........................ C01B 3/063 429/418
2013/0336879 A1* 12/2013 Yamazaki ............... C01B 3/042 423/658.2

OTHER PUBLICATIONS

Chueh et al., "High-Flux Solar-Driven Thermochemical Dissociation of $CO_2$ and $H_2O$ Using Nonstoichiometric Ceria," *Science*, Dec. 24, 2010; 330:1797-1801.

Chueh et al., "A Thermochemical Study of Ceria: Exploiting an Old Material for New Modes of Energy Conversion and $CO_2$ Mitigation," *Philosophical Transactions of the Royal Society A*, Jun. 21, 2010; 368:3269-3294.

Coray et al., "Experimental and numerical determination of thermal radiative properties of ZnO particulate media," *J. Heat Transfer*, Jan. 2010; 132(1):012701.

Davidson et al., "Solar Recycling of CO2 to fuels," Grant Abstract, Grant No. RL-0003-11, awarded by the University of Minnesota Institute on the Environment, Jul. 1, 2010-Dec. 31, 2014. Retrieved from the Internet on Apr. 6, 2015, http://projects.environment.umn.edu/forms/project_view.php?id=245; 2 pages.

Davidson et al., "Solar Fuels via Partial Redox Cycles with Heat Recovery," Grant Abstract, awarded by ARPA-E Department of Energy, Dec. 19, 2011-Jun. 18, 2015. Retrieved from the Internet on Apr. 6, 2015, http://arpa-e.energy.gov/?q=slick-sheet-project/solar-thermochemical-fuels-production; 1 page.

Diver et al., "Testing of a CR5 solar thermochemical heat engine prototype," *Proceedings of ASME 2010 4th International Conference on Energy Sustainability*, vol. 2, Phoenix, AZ; May 17-22, 2010; pp. 97-104.

Dombrovsky et al., "A diffusion-based approximate model for radiation heat transfer in a solar thermochemical reactor," *Journal of Quantitative Spectroscopy and Radiative Transfer*, Feb. 2007; 103(3):601-610.

Dombrovsky et al., "Transient temperature and thermal stress profiles in semitransparent particles under high-flux irradiation," *International Journal of Heat and Mass Transfer*, Jun. 2007; 50(11-12):2117-2123. Available online Dec. 28, 2006.

Dombrovsky et al., "An ablation model for the thermal decomposition of porous zinc oxide layer heated by concentrated solar radiation," *International Journal of Heat and Mass Transfer*, May 2009; 52(11-12):2444-2452.

Ganesan et al., "Experimental determination of spectral transmittance of porous cerium dioxide in the range 900-1700 nm," *ASME Journal of Heat Transfer*, Aug. 15, 2011; 133(10):104501.

Gokon et al., "Thermochemical two-step water-splitting reactor with internally circulating fluidized bed for thermal reduction of ferrite particles," *International Journal of Hydrogen Energy*, May 2008; 33(9):2189-2199.

Gokon et al., "Ferrite/zirconia-coated foam device prepared by spin coating for solar demonstration of thermochemical water-splitting," *International Journal of Hydrogen Energy*, 2011; 36:2014-2028.

Haile et al., "Thermochemical Routes to Efficient and Rapid Production of Solar Fuels," Grant Abstract, Grant No. 1038307, awarded by the National Science Foundation, Aug. 15, 2001-Jul. 31, 2014. Retrieved from the Internet on Nov. 10, 2010; 3 pages.

International Search Report and Written Opinion mailed Sep. 12, 2013, for International Application No. PCT/US2012/066301; filed Nov. 21, 2012; 6 pages.

International Preliminary Report on Patentability, issued May 27, 2014, for International Application No. PCT/US2012/066301; filed Nov. 21, 2012; 4 pages.

Jäger et al., "Determination of thermal radiative properties of packed-bed media containing a mixture of polydispersed particles," *International Journal of Thermal Sciences*, Aug. 2009; 48(8):1510-1516.

Krueger et al., "Design of a new 45 $kW_e$ high-flux solar simulator for high-temperature solar thermal and thermo-chemical research," *Journal of Solar Energy Engineering—Transactions of the ASME*, Feb. 3, 2011; 133(1):011013.

Lapp et al., "Analysis of Heat Transfer in a Solar Thermochemical Partial-Redox Reactor with Heat Recovery," *AIChE Annual Meeting*, abstract of presentation, Oct. 18, 2011, Minneapolis, MN.

Liang et al., "Experimental determination of transmittance of porous cerium dioxide media in the spectral range 300-1,100 nm," *Experimental Heat Transfer*, 2011; 24(4):285-299.

Lipinski et al., "Heterogeneous thermochemical decomposition under direct irradiation," *International Journal of Heat and Mass Transfer*, Apr. 2004; 47(8-9):1907-1916.

Müller et al., "Transient heat transfer in a directly-irradiated solar chemical reactor for the thermal dissociation of ZnO," *Applied Thermal Engineering*, Apr. 2008; 28(5-6):524-531.

Panlener et al., "A Thermodynamic Study of Nonstoichiometric Cerium Dioxide," *Journal of Physics and Chemistry of Solids*, Nov. 1975; 36(11):1213-1222.

Roeb et al., "Test operation of a 100 kW pilot plant for solar hydrogen production from water on a solar tower," *Solar Energy*, Apr. 2011; 85(4):634-644.

Roy et al., "Toward solar fuels: Photocatalytic conversion of carbon dioxide from hydrocarbons," *ACS Nano*, 2010; 4:1259-1278. Available online Feb. 8, 2010.

Schunk et al., "Ablative heat transfer in a shrinking packed-bed of ZnO undergoing solar thermal dissociation," *AIChE Journal*, Jul. 2009; 55(7):1659-1666.

Schunk et al., "Heat transfer model of a solar receiver-reactor for the thermal dissociation of ZnO—Experimental validation at 10 kW and scale-up to 1 MW," *Chemical Engineering Journal*, Aug. 1, 2009; 150:502-508.

Siegel et al., "Reactive Structures for two-step thermochemical cycles based on non-volatile metal oxides," *Proceedings of the ASME 2009 3rd International Conference on Energy Sustainability*, vol. 2, San Francisco, CA; Jul. 19-23, 2009.

Siegel et al., "Cerium oxide materials for the solar thermochemical decomposition of carbon dioxide," *Proceedings of the ASME 2010 4th International Conference on Energy Sustainability*, vol. 2, Phoenix, AZ; May 17-22, 2010.

United States Energy Information Administration, "U.S. Energy Consumption by Energy Source", *Annual Energy Review* 2008; Jun. 2009; 15 pages.

Van Orman et al., "Diffusion in oxides," in *Reviews in Mineralogy and Geochemistry*, 2010; 72:757-826.

Zhou et al., "Oxidation entropies and enthalpies of ceria-zirconia solid solutions," *Catalysis Today*, May 30, 2007; 123(1-4):86-93.

* cited by examiner

THERMOCHEMICAL REACTOR SYSTEMS AND METHODS

RELATED APPLICATION

This application is the §371 U.S. National Stage of International Application No. PCT/US2012/066301, filed 21 Nov. 2012, which claims the benefit of priority to U.S. Provisional Patent Application No. 61/562,345, filed on Nov. 21, 2011, both of which are incorporated herein by reference in their entireties to the extent that they do not conflict with the present disclosure.

STATEMENT OF GOVERNMENTAL SUPPORT

This invention was made with government support under EFR11038307, awarded by the National Science Foundation (NSF), and DE-AR0000182 awarded by the Department of Energy (DOE). The government has certain rights in the invention.

FIELD

The present disclosure relates to thermochemical reactor systems and thermochemical reaction methods associated therewith; particularly methods for production of a fuel, such as a gaseous fuel, hydrogen, carbon monoxide, or the like.

BACKGROUND

Thermochemical reactor systems typically employ solar energy to help drive endothermic chemical reactions at elevated temperatures. Such reactions may include production of fuels or fuel precursors; e.g. splitting water or carbon dioxide or upgrading of hydrocarbons, or the like. However, existing systems that use solar energy to drive endothermic reactions tend to suffer from drawbacks including being inefficient, being complex to build or operate, having short operational lifespan, etc.

BRIEF SUMMARY

The present disclosure describes, among other things, one or more thermochemical reactor systems that address one or more drawbacks of previous thermochemical reactor systems, such as inefficiency, complexity, or short lifespan.

In embodiments described herein, thermochemical reactor systems include a heat transfer element to increase efficiency of the system. Heat transfer accomplished by the element may be beneficial for systems in which reactions at two different temperatures are desired. For example, the systems may have a hot region in which solar energy is introduced and a cooler region at least partially shielded from the solar energy. A reactive element that includes at least one reagent may be cycled between the hot region and the cooler region so that the reagent, or a reaction product thereof, may facilitate or participate in the reactions in the hot region and the cool region. The system may be configured such that the heat transfer element captures heat from a portion of the reactive element as it leaves the hot region and transfers heat to the reactive element as it enters the hot region.

By way of example, a thermochemical reactor system may include a carrier comprising a reactive element and configured to rotate about a longitudinal axis such that, as a portion of the carrier rotates, the portion moves from the hot region to the cooler region, back to the hot region, etc. The carrier or a portion thereof surrounds an energy transfer element that is in coaxial arrangement with the carrier. Accordingly, the energy transfer element is disposed within the carrier or portion thereof. The system is configured such that the energy transfer unit rotates along the longitudinal axis within the carrier in a direction opposite to the rotation of the carrier. As a portion of the carrier rotates out of the hot region heat is transferred to a portion of the heat transfer element that is rotating into the hot region (which has just rotated through the cooler region and has thus been cooled). As a portion of the carrier rotates out of the cool region, and is thus cooled, and into the hot region, heat is transferred from a portion of the heat transfer element as it rotates out of the hot region (which has just rotated through the hot region and has thus been heated).

The reactive element may form the carrier or a portion thereof, may be disposed in the carrier or a portion thereof, or the like. The reactive element includes at least one first reagent that undergoes a first reaction in the hot region to produce a product that is moved; e.g. rotated, to the cooler region. The product undergoes a reaction in the cooler region to regenerate the first reagent that is moved; e.g. rotated, to the hot region where the first reagent may again undergo the first reaction. Preferably, the first reaction is an endothermic reaction that may benefit from heat provided by solar energy in the hot region.

The first reagent may be a compound capable of undergoing cyclic redox reactions, such as a metal oxide. By way of example, the metal oxide may be reduced in the hot region to release oxygen and may be oxidized in the cool zone to regenerate a metal oxide having an original oxidization state. The metal oxide may be oxidized with water, carbon dioxide, or the like, resulting in generation of hydrogen, carbon monoxide, or the like. The resulting hydrogen or carbon monoxide may be used as fuels or may be reacted to generate fuels. For purposes of this disclosure, a compound that may be used as a fuel or to generate a fuel without addition of energy or of substantial energy (e.g., reaction of carbon monoxide and hydrogen to produce methanol) are referred herein to as a “fuel”.

In embodiments, the thermochemical reactor systems described herein are stationary. By not having moving parts, the thermochemical reactor systems may be simpler to build or operate or may have longer operational lifespans than systems with moving parts. In embodiments, a stationary thermochemical reactor includes a sealed reaction chamber, which may form a carrier or a portion thereof, in which a metal oxide is disposed. The reaction chamber is hermetically sealed with respect to the inside of the thermochemical reactor. The reaction chamber is positioned in the thermochemical reactor such that the chamber and its contents are heated by solar energy entering the reactor. In embodiments, the chamber is translucent or transparent and allows solar light to enter the chamber and interact with the metal oxide disposed therein. The chamber contains at least one inlet port and at least one outlet port through which fluid, such as gas, may flow. Alternatively or in addition, the chamber may contain one or more ports that serve as both an inlet and an outlet. An inert gas, such as nitrogen, may be introduced into an inlet and allowed to flow through an outlet to provide a carrier stream. The carrier stream may carry oxygen released from the metal oxide due to reduction of the metal oxide as a result of heat generated by solar energy. Alternatively or in addition, the released oxygen may be evacuated from the chamber by applying a vacuum to an outlet. An oxidizing compound, such as water or carbon dioxide, may then be introduced into an inlet to react with the reduced metal oxide to regenerate a metal oxide with an original oxidation state and to reduce the oxidizing compound (e.g. reduced water to hydrogen or reduce carbon dioxide to carbon monoxide), while unreacted oxidizing compound (e.g., water or carbon dioxide) and reduced oxidizing compound (e.g. hydrogen or carbon monoxide) exit an outlet.

One or more embodiments of the thermochemical reactor systems or methods described herein provide one or more advantages over prior systems or thermochemical reaction methods. For example, embodiments described herein have improved heat recuperation and transfer assemblies and processes that increase efficiency relative to existing thermochemical reactor systems. Embodiments described herein provide thermochemical reaction systems that have no moving parts that may render manufacture or operation less complex or may increase the operational life of the system. These and other advantages will be readily understood from the following detailed description when read in conjunction with the accompanying drawings.

Figure 1:
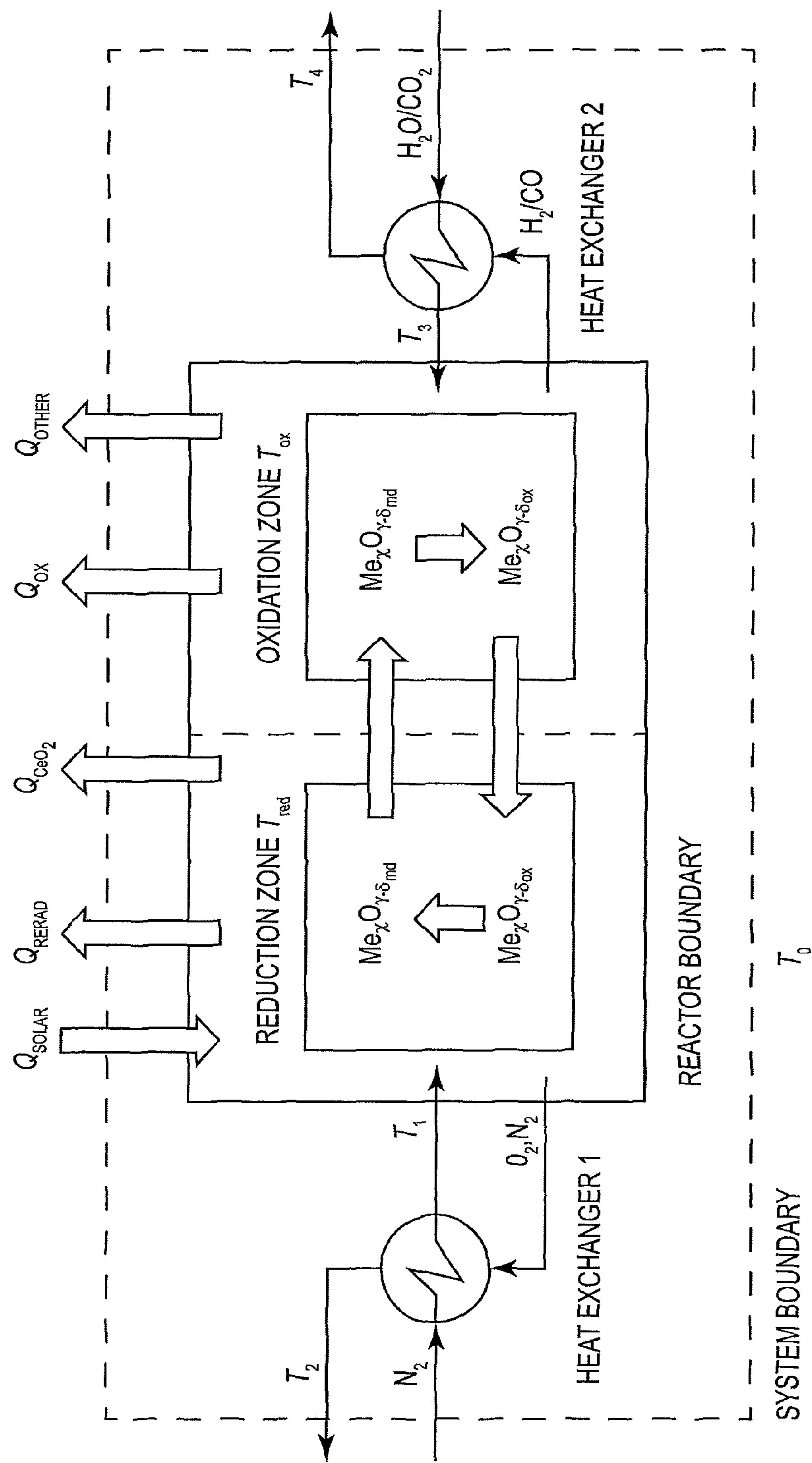
FIG. 1 is a schematic process diagram of $CO_2/H_2O$ splitting via non-stoichiometric metal oxide dual-temperature redox cycles.

The schematic drawings are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms “a”, “an”, and “the” encompass embodiments having plural referents, unless the content clearly dictates otherwise. As used in this specification and the appended claims, the term “or” is generally employed in its sense including “and/or” unless the content clearly dictates otherwise.

As used herein, “have”, “having”, “include”, “including”, “comprise”, “comprising” or the like are used in their open ended sense, and generally mean “including, but not limited to”. It will be understood that “consisting essentially of”, “consisting of”, and the like are subsumed in “comprising” and the like. As used herein, “consisting essentially of,” as it relates to an article, method, system or the like, means that the components of the article, method, system or the like are limited to the enumerated components and any other components that do not materially affect the basic and novel characteristic(s) of the article, method, system or the like.

Any direction referred to herein, such as “top,” “bottom,” “left,” “right,” “upper,” “lower,” and other directions and orientations are described herein for clarity in reference to the figures and are not to be limiting of an actual device or system or use of the device or system. Devices or systems as described herein may be used in a number of directions and orientations.

As used herein, “inert” (e.g., inert compound, inert gas, inert wall, inert frame, inert material, inert energy transfer cylindrical element, etc.) means substantially nonreactive with reactants or products of the oxidation and reduction reactions in the reactor system. For example, “inert” compounds or gases may include nitrogen, noble gases, and other compounds known to one of skill in the art. An “inert” gas may refer to a gas that functions as a carrier gas and/or purge gas. In one or more embodiments, the weight percentage of an inert compound or material (e.g., of a reactor system component) that reacts, under reaction conditions, may be 10% or less, 1% or less, or 0.1% or less. In one or more embodiments, an inert compound or material is entirely nonreactive under reaction conditions.

The present disclosure provides one or more exemplary embodiments of thermochemical reactor systems and thermochemical reaction methods using thermochemical reactor systems. Any suitable reaction may be carried out in the reactor systems described herein. The systems described herein may be readily modified to carry out a desired reaction. Typically, reactions requiring heat; i.e. endothermic reactions, will benefit from the systems described herein.

In embodiments, the reactor systems are configured to cycle a reagent or a product thereof between a hot region and a cooler region. Such systems may be beneficial for two-stage reactions or two different reactions where different temperatures are desired. In embodiments, a reagent or reaction product thereof cycles between the hot region and the cooler region. In embodiments, the reagent is converted to a reaction product in the hot region or the cooler region and regenerated in the cooler region or the hot region. In embodiments, the reagent or reaction product cycled between the hot region and the cool reagent is a compound capable of cycling between an oxidized state and a reduced state. The reagent or reaction product may then participate in redox reactions in the hot region and cooler region.

An example of a reagent capable of cycling between an oxidized state and a reduced state is a metal oxide. Any suitable metal oxide may be used. Examples of metal oxides that may be used include ceria ($CeO_2$), a mixed oxide of, for example, cerium and zirconium ($Ce_{1-x}Zr_xO_2$), etc. A metal oxide may or may not include lanthanide (e.g., Sm, Gd, La, Y, etc.) substitutions or amounts of transition metals (e.g., Mn, Ti, Ni, etc.). A metal oxide may include non-stoichiometric metal oxides (e.g., $CeO_{2-\delta}Ce_{1-x}Zr_xO_{2-\delta}$, etc., wherein δ may be at least 0.001, at least 0.01, at least 0.02, at least 0.05, etc.). Suitable materials for the reactive cylindrical element may be commercially available from, for example, Zircar Zirconia (Florida, N.Y.), Applied Ceramics (Atlanta, Ga.), and Advanced Ceramic Technology (Orange, Calif.). In embodiments, metal oxides may be formed from metal oxides or pure metals that are capable of being oxidized. For the purposes of this disclosure, oxidizable metal oxides and pure metals are referred to as metal oxides.

Metal oxides may be prepared as high porosity structures. For example, high porosity metal oxides may be prepared using a simple "low-tech" process in which one or more oxide powders are lightly compacted at room temperature using isopropanol as a wetting agent followed by sintering at high temperature. With such processes, porosities of about 70% to about 90% may be achieved. Of course any suitable method for producing metal oxides or porous metal oxides may be employed.

The metal oxide or other suitable redox reagent may form or be disposed on or in a carrier, or portion thereof, that cycles between the hot region and the cool region; e.g. as will be discussed in more detail below.

The reduction of a metal oxide is typically an endothermic reaction, which may be carried out in the hot region. The preferred temperature for achieving reduction of a metal oxide varies depending on the composition of the metal oxide. For example, a temperature from about 1200° C. to about 1600° C. may be desired for the reduction of the metal oxide. Of course, a temperature below about 1200° C. or above about 1600° C. may be suitable for reduction of the metal oxide.

In embodiments, a metal oxide or other suitable redox compound is reduced at elevated temperatures under an inert gas that serves as a carrier gas to carry oxygen produced from the reduction of the metal oxide away from the reduced metal oxide. Alternatively or in addition, the oxygen may be removed via vacuum. The reduced meal oxide may then be removed from the hot region and enter a cooler region where it may be exposed to an oxidizing compound under conditions that result in oxidization of the metal oxide and reduction of the oxidizing compound. Any suitable oxidizing compound may be reacted with the reduced metal oxide or other reduced redox compound.

In embodiments, the oxidizing compound is a fuel precursor. For example, the oxidizing compound may be water or carbon dioxide that may be reduced to the fuels, hydrogen or carbon monoxide, respectfully. Chemical oxidization of a metal oxide by a water or carbon dioxide may be carried out at any suitable temperature, such as from about 500° C. to about 1200° C. Of course, a temperature below about 500° C. or above about 1200° C. may be suitable for oxidization of the metal oxide with water or carbon dioxide.

While the thermochemical reactor systems described herein may be used for purposes of any suitable thermochemical reaction, the remainder of this disclosure will discuss the systems with regard to redox reactions for the production of fuels, specifically the production of hydrogen or carbon monoxide.

The reactions involved in the splitting of water or carbon dioxide to hydrogen or carbon monoxide based on non-stoichiometric metal oxides are shown below:

$$\text{Endothermic step: } \frac{1}{\Delta\delta}M_xO_{y-\delta_{ox}} \rightarrow \frac{1}{\Delta\delta}M_xO_{y-\delta_{red}} + \frac{1}{2}O_2 \quad (1)$$

$$\text{Exothermic step: } \frac{1}{\Delta\delta}M_xO_{y-\delta_{red}} + H_2O \rightarrow \frac{1}{\Delta\delta}M_xO_{y-\delta_{ox}} + H_2 \quad (2a)$$

$$\frac{1}{\Delta\delta}M_xO_{y-\delta_{red}} + CO_2 \rightarrow \frac{1}{\Delta\delta}M_xO_{y-\delta_{ox}} + CO \quad (2b)$$

$$\text{Net: } H_2O \rightarrow H_2 + 0.5O_2 \quad (3a)$$

$$CO_2 \rightarrow CO + 0.5O_2 \quad (3b)$$

In reactions (1), (2*a*), and (2*b*), M represents a metal and "x" and "y" represent stoichiometric amounts of the metal and oxygen in a metal oxide. The thermochemical cycle (1)-(2) ("(2)" refers to one or both of reactions (2*a*) and (2*b*)) replaces the single thermal dissociation reaction of water or carbon dioxide by two more favorable reactions; the net result is the splitting of, for example, water (3*a*) or carbon dioxide (3*b*). The endothermic step (1) is the endothermic thermal reduction of the metal oxide. This step is carried out in a hot region, such as at a location of a reaction placed at the focal point of a solar concentrating system as will be discussed in more detail below. The exothermic step (2) is the oxidation of the reduced metal oxide to form $H_2$ or CO. In reactions (1) and (2), $\delta_{ox}$ and $\delta_{red}$ are the non-stoichiometric coefficients of the reduced and oxidized forms of the metal oxide in the redox cycle, and $\Delta\delta=\delta_{red}-\delta_{ox}$.

FIG. 1 shows a simplified process diagram of $CO_2/H_2O$ splitting via non-stoichiometric metal oxide redox cycles in a dual temperature cycle.

Figure 2:
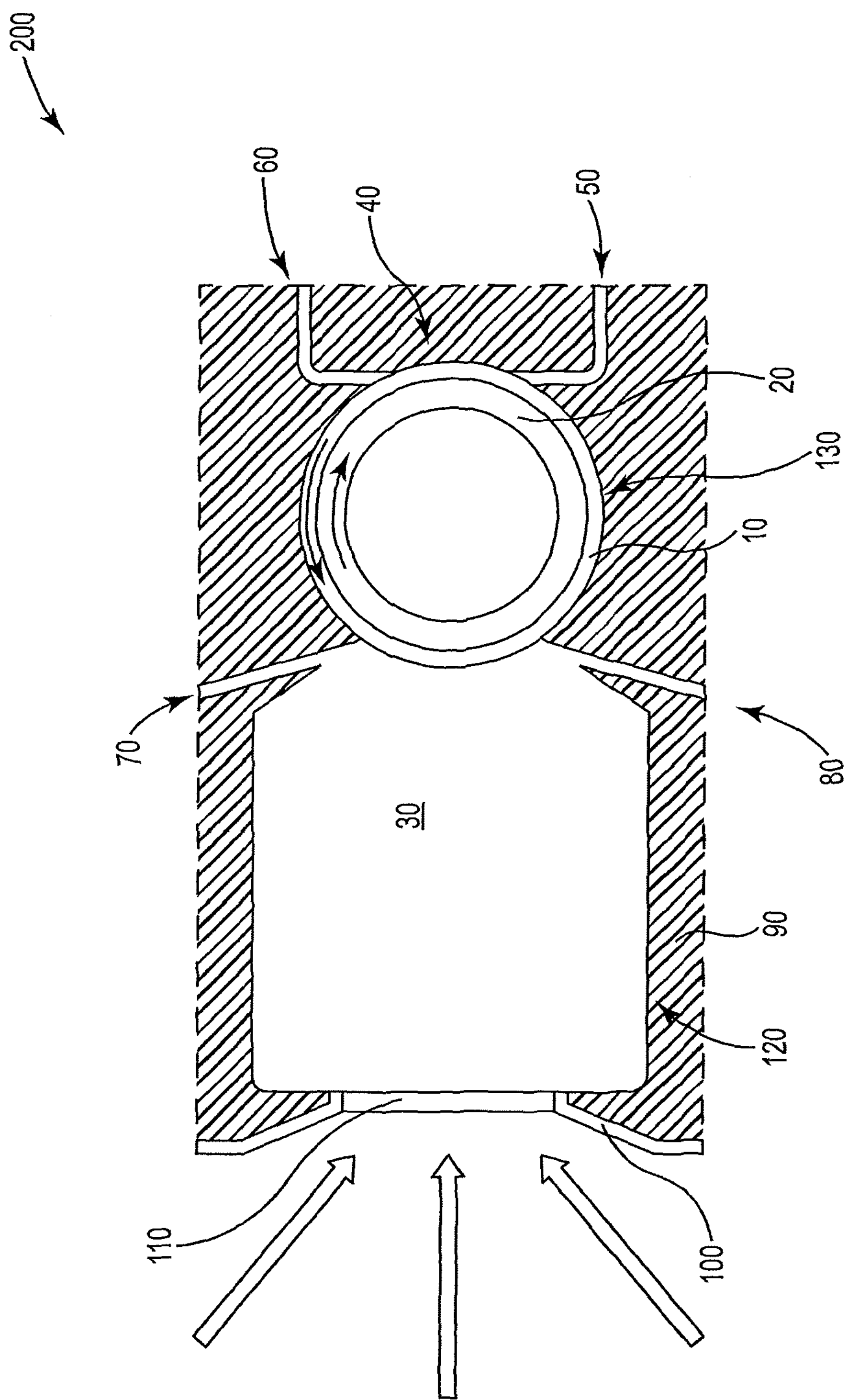
FIG. 2 is a schematic drawing of an embodiment of a thermochemical reactor system described herein.
Figure 3A:
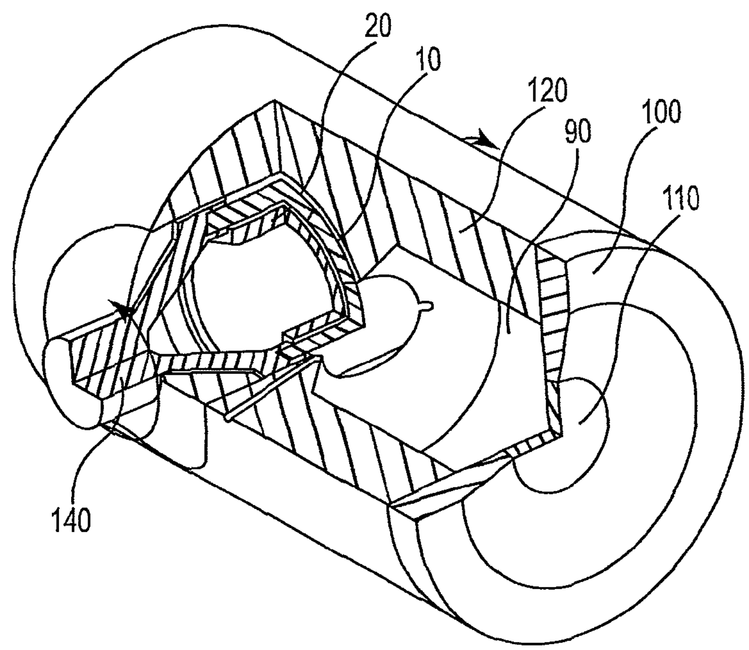
FIGS. 3A-B are schematic 3D renderings of an embodiment of a thermochemical reactor system: (A) partial view of the cavity and reactive element, and (B) partial view of the cavity and energy transfer element.
Figure 3B:
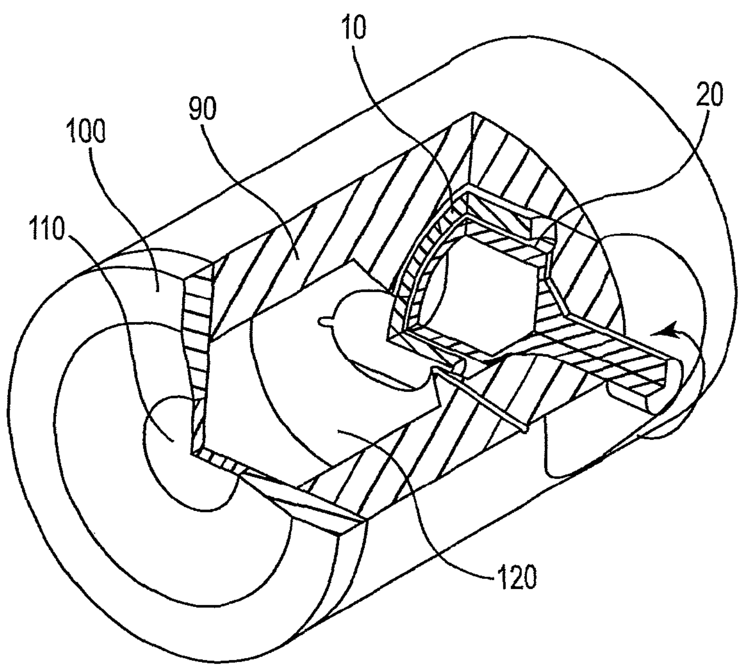
Figure 4:
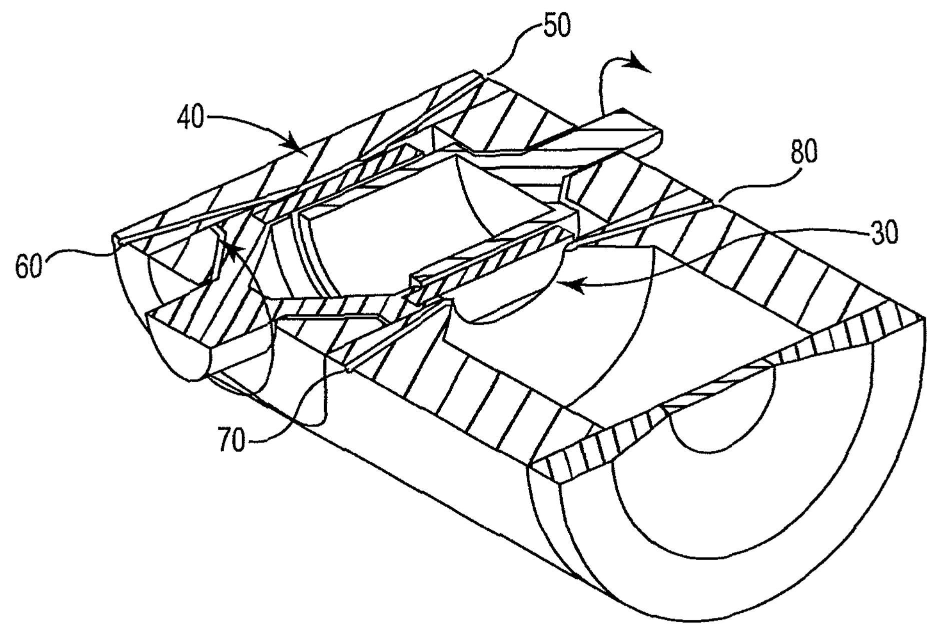
FIG. 4 is a schematic 3D rendering of an embodiment of a thermochemical reactor system showing hot and cooler regions, and gas inlet and outlet ports.
Figure 5:
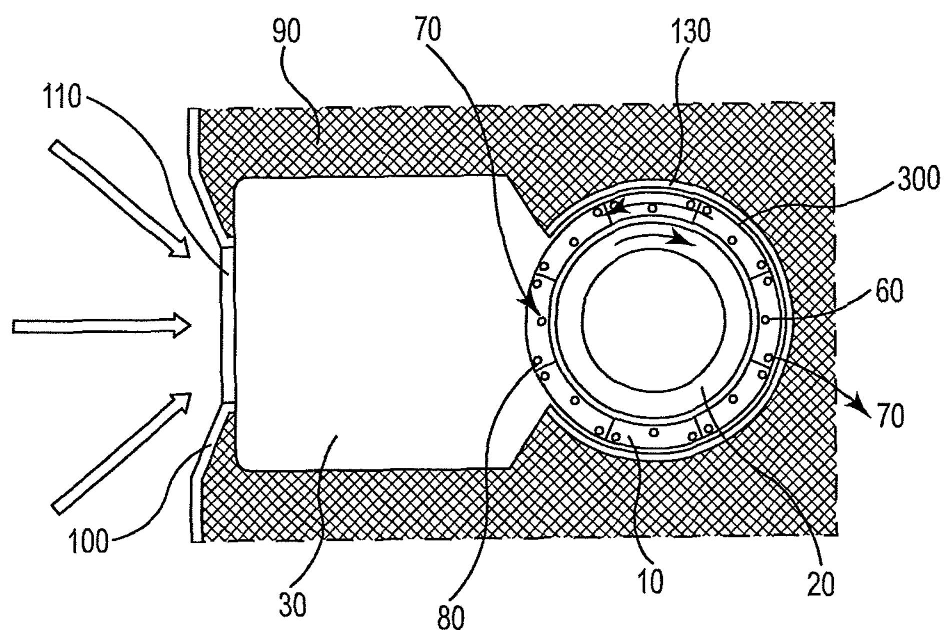
FIG. 5 is a schematic drawing of an embodiment of a thermochemical reactor system as described herein.

Referring now to FIGS. 2-4, an embodiment of a thermochemical reactor system 200 is shown. The reactor system 200 employs a dual-temperature reaction cycle in which portions of a carrier 10 cycle between a hot region 30 and a cooler region 40. In the hot region 30, the carrier 10 is exposed to an inert gas, such as nitrogen, introduced through inlet 70. In the depicted embodiments, the carrier 10, or portion thereof, is formed from a reactive element such as metal oxide, coated with a metal oxide, or the like. The inert gas introduced through the inlet 70 carries oxygen, $O_2$, produced from reduction of the metal oxide through outlet 80. The reduced metal oxide on, in, or of the reactive element 10 then may rotate into the dark zone wherein it may interact with water or carbon dioxide introduced through inlet 50 under conditions sufficient to oxidize the metal oxide and reduce the water or carbon dioxide. Unreacted water or carbon dioxide, as well as hydrogen or carbon monoxide, can exit via outlet 60.

In embodiments, the carrier 10 rotates continuously or discontinuously so that as the metal oxide in the hot region 30 is reduced to a lower valence metal oxide, it is rotated to the non-irradiated cooler region 40 where the oxidation reaction (e.g., reaction 2, above) takes place thereby reoxidizing the metal oxide. The reaction takes place as oxidizing gases (e.g., steam or carbon dioxide) sweep through the material. In embodiments, a cycling rate of 1 revolution per minute (rpm) may be targeted, but other cycling rates greater than 1 rpm or less than 1 rpm may be used.

In embodiments, carrier 10 is in the form of a hollow rod or cylinder. Of course, carrier 10 may be of any shape and may be continuous or discontinuous. Regardless of the shape of the carrier 10, the carrier 10 rotates generally about its longitudinal axis.

In the hot region 30, concentrated solar radiation enters a cavity formed by an inner wall 120 through an aperture 110. As used herein, an "aperture" is any type of passageway, such as a window, through which radiation may enter the reactor system chamber in the hot region 30. Aperture 110 may be an opening, but preferably is a solid material that seals the cavity in the hot region 30 to prevent reducing atmosphere (e.g., inert gas) introduced via inlet 70 from mixing with ambient air. A sealing aperture 110 may be formed from any suitable material, such as transparent quartz. The aperture 110 may be sealed relative to face plate 100 or wall 120. The face plate 100 may be cooled, e.g. water cooled.

Incident solar radiation (indicated by arrows directed at aperture 110) may be highly directional, and thus its path of transfer may be controlled to enhance direct solar radiative transfer to a site within the cavity where the metal oxide undergoes reduction.

The inner wall 120 forming the hot region cavity 30 may be made of any suitable material. Preferably, the wall 120 is formed of material that can withstand the temperatures within the hot zone and that is highly reflective. Some example materials that may be used to form wall 120 are inert oxides, $Al_2O_3$, and the like. Face plate 100 may also be formed from such materials.

Preferably, physical contact area between areas forming the hot region 30 and cooler region 40 is minimized to reduce the heat and mass transfer between the two regions. Thermal expansion may be accommodated by the system 200 by employing appropriate spacing between the rotating elements (e.g., the carrier 10 and the energy transfer element 20) and between the carrier 10 and the wall of the reactor within which the carrier 10 rotates.

In the embodiment depicted in FIGS. 2-4, the system 200 includes an energy transfer element 20 that is surrounded by the carrier 10. That is, the energy transfer element 20 is disposed within the carrier 10. The energy transfer element 20 is positioned co-axially within the carrier 10 and rotates in a direction opposite the reactive element 10. As the carrier rotates from the hot region 30 to the cooler region 40, it loses heat to the counter-rotating heat transfer element 20, via radiative and convective heat transfer. The carrier 10 may also be heated by the heat transfer element 20 as the carrier 10 rotates from the dark to the light zone. In embodiments, a small gap is maintained between the rods to eliminate direct contact, and to provide frictionless rotation.

In embodiments, a radiation shield 130 formed of highly-reflective high-temperature materials is applied on the reactor wall surrounding the reactive element 10 to reduce radiative losses through the outer surface of the reactive rod. The reactor may also include insulation 90 to reduce thermal loss. Any suitable insulative material may be used.

As indicated in FIG. 2, a gap exists between the radiation shield 130 and the carrier 10 to allow frictionless rotation of the carrier 10 and to allow for thermal expansion, as necessary. Accordingly, it is possible that oxidative gases (e.g. steam or carbon dioxide) introduced through inlet 50 may flow through gap to the hot zone, or reductive gas (e.g. oxygen) may flow through the gap to the cooler zone 40. Such flow is undesirable and may be minimized through inlet 50, 70 and outlet 60, 80 design parameters, such as diameter, geometry, angle of entry, etc. and adjusting gas flow rate.

Referring now to FIGS. 5-8, an embodiment of a thermochemical reactor system 200 or components thereof is shown. The system 200 and components depicted in FIGS. 5-8 includes many of the same components as the system depicted in FIGS. 2-4 and described above with regard to FIGS. 2-4, with like numbers referring to like or similar components. However, the system 200 depicted in FIGS. 5-8 includes a modified gas management system and the carrier 10 includes sealed reaction chambers 300 in which a reactive element, such as a metal oxide, is disposed.

Figure 6:
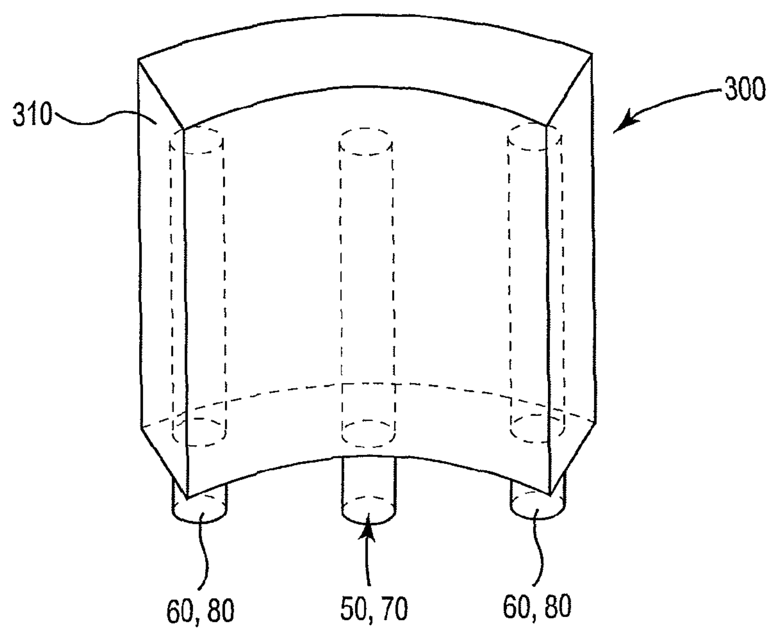
FIG. 6 is a schematic rendering of a portion of a reactive element according to an embodiment described herein.

As depicted in FIG. 6, a sealed reaction chamber 300 that forms the reactive element or a portion thereof, include a gas inlet 50, 70 and outlet 60, 80. The chamber is formed by a gas impermeable coating or housing 310. In embodiments, the housing 310 is formed of a thin gas impermeable layer of a semitransparent oxide (e.g., an inert oxide, $Al_2O_3$, etc.). Of course, the housing 310 may be formed of any other suitable material and need not be transparent, but preferably is highly heat conductive. Preferably, the housing 310 is inert. Inlet 50, 70 and outlet 60, 80 ports are configured to sealingly mate with ports of rotating manifold 400 (see, e.g., FIGS. 7A and 8).

Each sealed reaction chamber 300 provides an independent chemical environment. Reactive element, such as metal oxide (not shown), disposed within the chamber 300 is preferably porous to allow for gas flow through the chamber from the inlet 50, 70 to the outlet 60, 80 ports. The morphology of the metal oxide (pore size distribution, pore volume fraction) and location and shapes of the gas flow passes may be tailored to effect improved heat and mass transfer (including gas flows between the inlet and outlet ports), chemical kinetics, radiative absorption, and mechanical durability. By flowing gases through sealed reaction chambers 300, undesirable mixing of gases in the reduction and oxidation zones of the reactor, as discussed above with regard to the embodiment depicted with regard to FIGS. 2-4, may be reduced or eliminated. Accordingly, overall efficiency may be enhanced.

The thermochemical reactor system depicted in FIGS. 5-8 may have an advantage of providing enhanced mechanical durability. For example, thermal expansion stresses may be mitigated because the design does not require sealing between reactor zones (e.g., oxidation zone and reduction zone), as the reaction chambers 300 of the carrier 10 may be, themselves, sealed. Expansion may be accommodated by applying appropriate spacing between the reaction chambers 300 of the carrier 10.

Figure 7A:
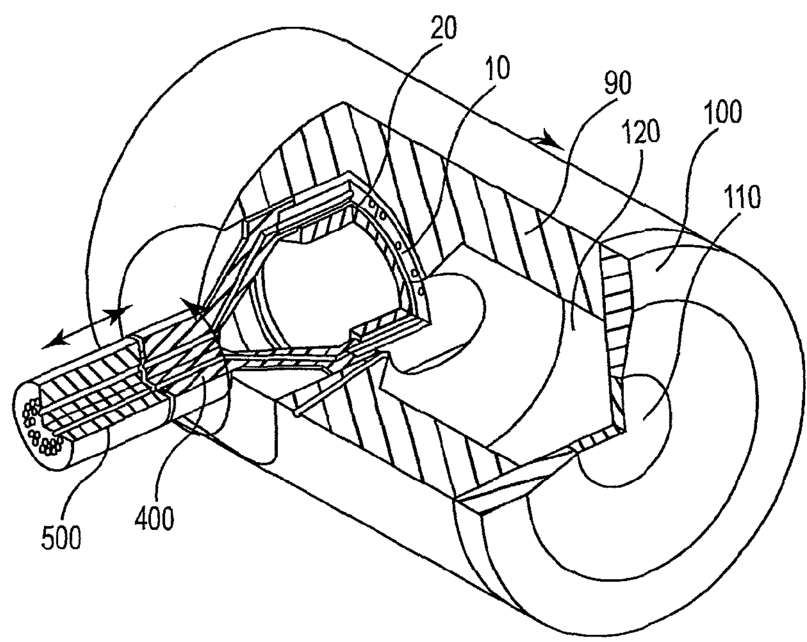
FIGS. 7A-B are schematic 3D renderings an embodiment of a reactor system: (A) partial view of the cavity and reactive elements, and (B) partial view of the cavity and the energy transfer element.
Figure 7B:
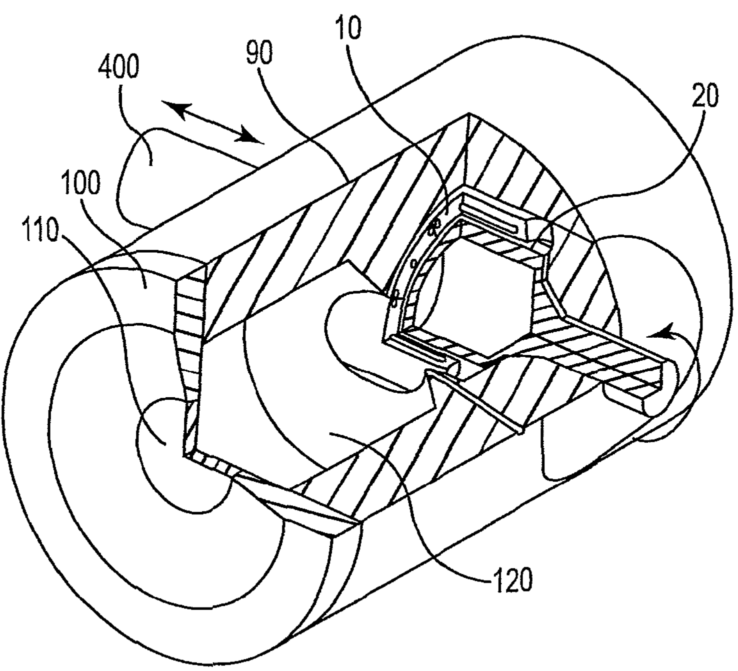
Figure 8:
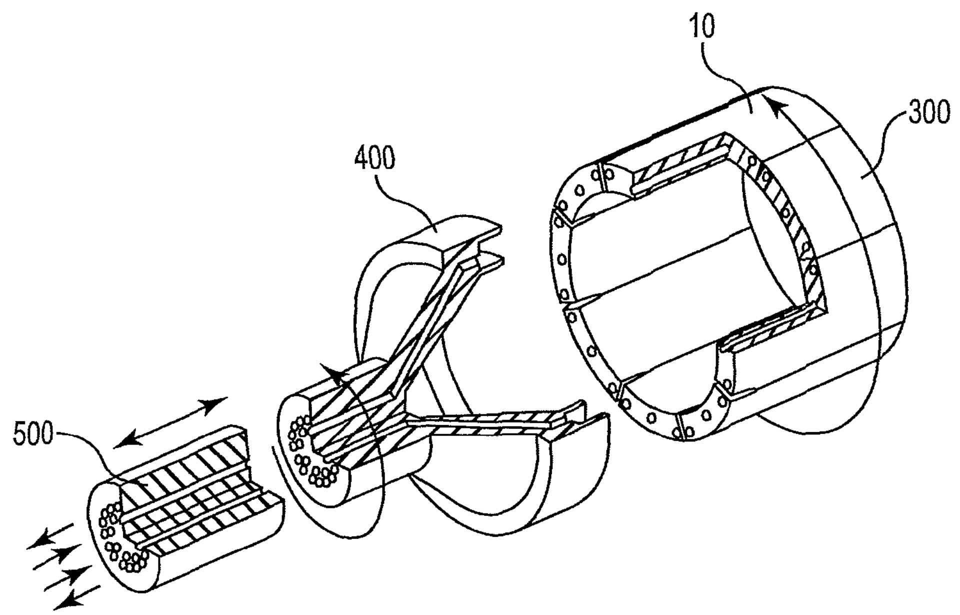
FIG. 8 is a schematic partial cut-away exploded view showing details of an exemplary gas flow management system.

Referring now to FIGS. 7-8, views of the reactor system detailing the gas flow management system are shown. In embodiments, gases are delivered and removed from the sealed reaction chambers of the rotating reactive element 10 by an external gas distribution system connecting to an external manifold 500. The external manifold 500 undergoes cyclic step-wise axial translation so that its embedded channels match appropriate channels embedded in the step-wise rotating internal manifold 400. The internal manifold 400 holds the carrier 10 and has channels that mate with the inlets and outlets of the sealed reactive chambers 300. The internal manifold 400 rotates with the carrier 10 containing the sealed reactive chambers 300 to maintain sealing engagement between the inlets and outlets of the reactive chambers 300 and the channels of the manifold 400.

Because the internal manifold 400 rotates in a step-wise manner, the external manifold 500 may sealingly engage and then disengage with the internal manifold 400 between rotational steps. The external manifold 500 may translate axially to engage and disengage the internal manifold 400. When the external manifold 500 engages the internal manifold 400, channels of the external manifold are placed in sealing communication with channels of the internal manifold, which are in sealing communication with inlet and outlet ports of the sealed reaction chambers.

The inlet ports of the sealed reaction chambers 300 (e.g., central ports in all reactive elements in the example configuration shown) in the depicted embodiment receive the inert gas (for example, $N_2$) or vacuum to remove oxygen released from the metal oxide when the reactive elements face the hot region during the reduction step, and the oxidizer ($H_2O$ or $CO_2$) when the same reactive elements are rotated away from the hot region towards the cooler region. The outlet ports are used to remove the $O_2$ or the $O_2/N_2$ mixture when the sealed reaction chambers are irradiated during the reduction step. The same outlet ports are used to remove fuel ($H_2$ or CO) produced during the oxidation step when the sealed reaction chambers are rotated away from the hot region towards the cooler region. A peripheral gas distribution system consisting of multiple valves for each inlet/outlet port and 4 gas flow controllers for vacuum or $N_2$, $H_2O/CO_2$, $O_2$ or $O_2/N_2$, $H_2/CO_2$ flows, respectively, allows for flexibility with respect to gas flow management Preferably, the contact area between the internal 400 and external 500 manifolds is outside the zone of the highest reactor temperature, which may relax the constraints on the materials used to design and manufacture the interface with high precision.

Figure 9A:
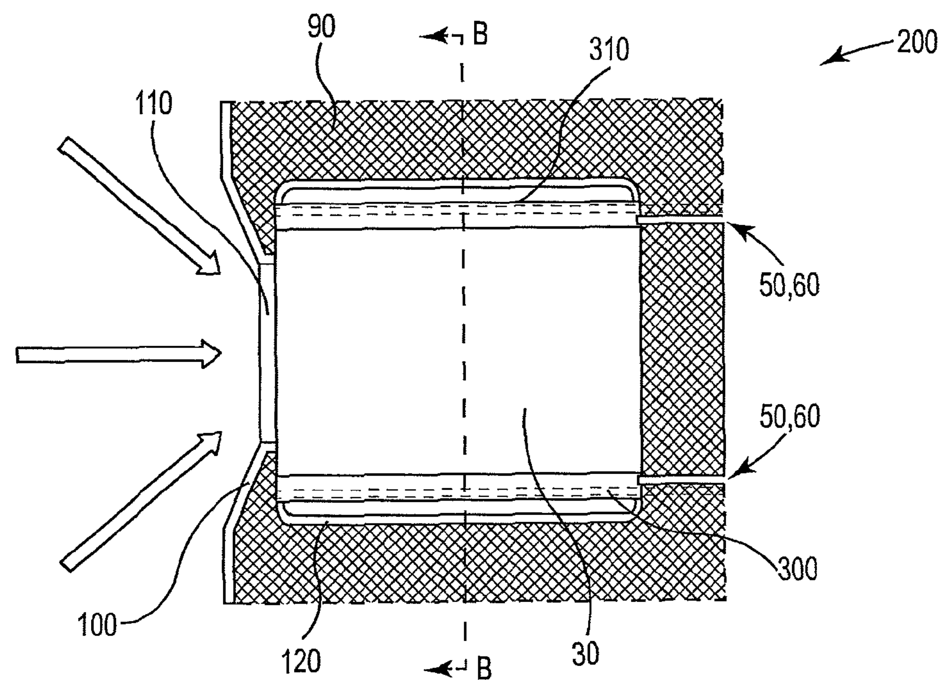
FIGS. 9A-B are schematic drawings of a thermochemical reactor according to an embodiment described herein: (A) axial cross-section A-A, and (B) radial cross-section B-B.
Figure 9B:
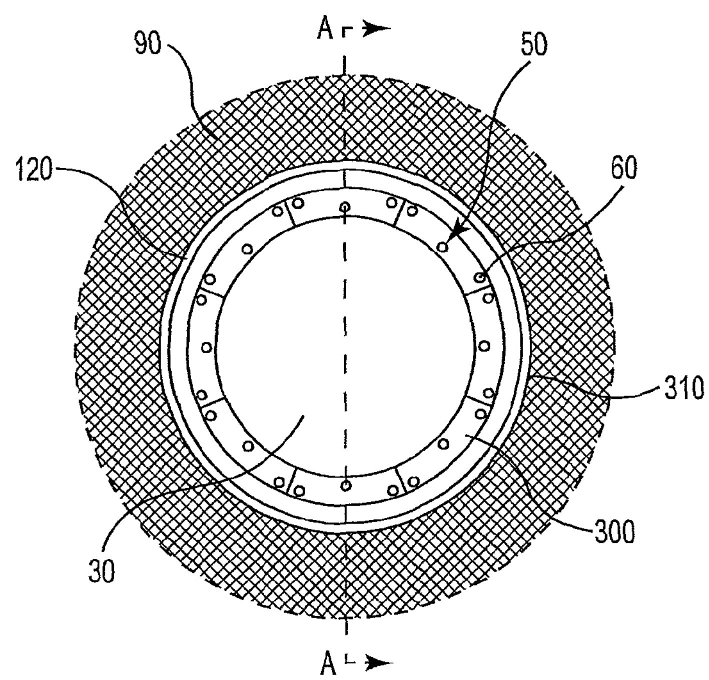
Figure 10A:
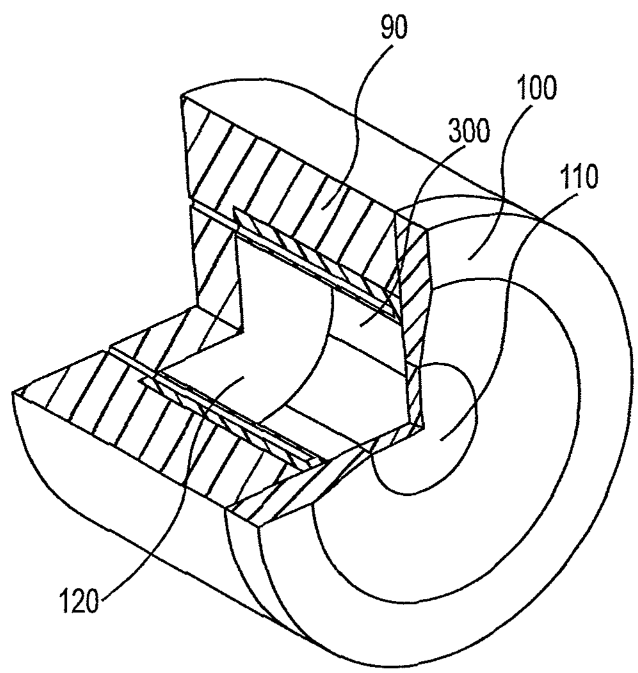
FIGS. 10A-B are schematic drawings of 3D rendering of the thermochemical reactor concept of FIG. 9: (A) partial view of the cavity and reactive elements with the gas distribution system, and (B) gas flow pathways.
Figure 10B:
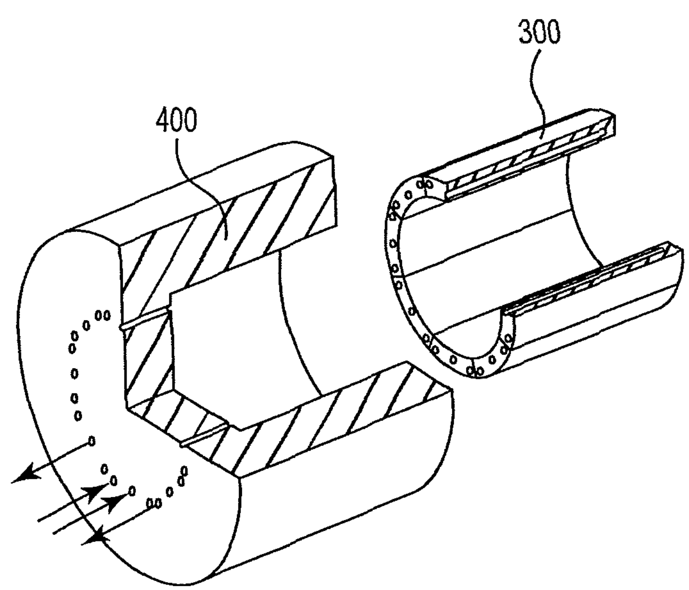

Referring now to FIGS. 9-10, an embodiment of a thermochemical reactor system 200 is shown. The reactor system 200 may be employed for chemical cycling under approximately isothermal conditions and does not include a rotating carrier. However, the system 200 depicted in FIGS. 9-10 does share many similarities to the systems depicted in FIGS. 2-8, with like numbers referring to like components. By way of example, the system depicted in FIGS. 9-10, includes an aperture 100 for allowing concentrated solar energy to enter into and heat chamber 30. Aperture 110 is sealed relative to face plate 100 or inner wall 120 that forms cavity 30, which is insulated by insulation 90. One or more sealed reaction chambers 300 are placed within the reactor cavity 30. The sealed reaction chambers 300 have gas impermeable housings 310 or coatings that sealingly engage inlet 50 and outlet 60 ports. The ports 50, 60 are in sealing communication with channels of manifold 400 that couples ports 50, 60 to an external gas management system. The housing 310 of the sealed reaction chambers 300 may be transparent or non-transparent; e.g., as discussed above with regard to FIGS. 5-8. Metal oxide, which may be porous, is disposed within the chambers 300.

By way of example, the thermochemical reactor system 200 depicted in FIGS. 9-10 may implement the cycle (1)-(2) (as discussed above with regard to water or carbon dioxide splitting) under, for example, approximately isothermal operation with temperature variations imposed by, for example, incident solar flux distribution, heat transfer conditions in the cavity 30, and thermal effects of the reduction and oxidation reactions.

The thermochemical reactor system 200 depicted in FIGS. 9-10 is relatively simple and features a stationary cavity containing sealed reaction chambers 300 in which metal oxide is disposed. One or a number of sealed reaction cavities 300 may be positioned concentrically within a secondary cavity made out of high-temperature insulated inert wall 90 that can also be shielded 120 to minimize direct-contact heat transfer from the sealed reaction chambers 300 to the reactor wall 120. Under the greatly simplified operational conditions, partial redox cycling may be realized by alternating gas flows through permeable embedded channels. Elements undergoing reduction and oxidation reactions may be intertwined (e.g., alternating) to maximize heat transfer between the two cycle steps, and thus effectively recover the enthalpy of the oxidation reaction for the reduction reaction.

In steady-state operation, reactive element in a certain number of reaction chambers may realize the reduction step, while the remaining reactive element in other reaction chambers may concurrently realize the oxidation step. Inert gas may be pumped to the inlet ports of the chambers having reactive element realizing the reduction step and the $O_2$/gas mixture may be removed from the outlet ports of these chambers. In addition or alternatively, oxygen may be evacuated from the reaction chambers by pulling a vacuum on a port of the chamber. For example, the inlet ports may be sealed while $O_2$ is removed by evacuating the reaction chamber. At the same time, the oxidizer may be pumped into inlet ports of the chambers having reactive element realizing the oxidation step and fuel may be removed from the outlet ports of these elements. Once both steps have been carried to completion, the inert gas may be replaced by the oxidizer for the reduced elements and the oxidizer may be replaced by the inert gas for the oxidized elements using the same ports and an external gas distribution system with multiple valves on each port and 4 gas flow controllers—a system similar to that used which may be used for embodiments employing a rotating reactive cylindrical element. The process may be repeated cyclically. Direct contact of the elements undergoing reduction and oxidation may facilitate efficient heat transfer from the exothermic step to the endothermic step (in presence of a slight temperature gradient), which may effectively result in continuous heat recovery from the exothermic step to the endothermic step. Note that both steps may occur simultaneously in different chambers, and thus solar energy may be utilized continuously, resulting in no idle periods for solar operation, and no decrease in the solar-to-fuel efficiency. In contrast, in a batch operation all elements would undergo either reduction or oxidation. Thus, solar energy would be not used during the exothermic step. Obviously, the presence of the reactive element realizing the exothermic step in the cavity does not change the thermodynamic heat requirement of the cycle. When all heat released in the oxidation step is assumed to be transferred to the reduction step, the net heat requirement of the approximately isothermal cycle is reduced and may be equal to the enthalpy of water dissociation at the reactor temperature, but the overall process may be still strongly endothermic. This net heat requirement may be continuously supplied by solar radiation. For a fixed nominal reactor power $p_{solar}$, defined as the solar power incident at the reactor aperture, one may effectively increase the molar fuel production rate $r_{fuel}$ by increasing the amount of metal oxide (e.g., ceria, etc.) in the reactor to utilize all available heat (solar+exothermic). This in turn will increase efficiency (inspecting the efficiency definition):

$$\eta = \frac{r_{fuel}\Delta H_{fuel}}{p_{solar} + p_{parasitic}}$$

where $\Delta H_{fuel}$ is the higher heating value of the fuel and $p_{parasitic}$ is any parasitic power used in the system.

It will be understood that the design or selection of metal oxides for use in the approximately isothermic system depicted in FIGS. 9-10 may affect the efficiency of oxidation and reduction under the temperature constraints in the system.

While depicted as cylindrical, it will be understood that the reactor cavity 30 may be of any suitable shape or size. Similarly the reaction chambers 300 individually or collectively may be of any suitable shape or size and may be positioned in any suitable manner within the reactor cavity 30.

In embodiments, a thermochemical reactor system described herein may include auxiliary equipment. By way of example, a reactor system (e.g., inlet gas management system, outlet gas management system, etc.) may include one or more control systems or processors that may include, without limitation, one or more hardware components, software (e.g., control software, etc.), one or more computers, one or more timing mechanisms, sensors, regulators, valves, gas conduits (e.g., pipes, tubes, etc.), data input devices, data display devices, etc. A reactor system may include any of a wide variety of components to allow an input signal to be generated or received, a module to receive the input signal and generate an output signal to a flow controller, pressure controller, temperature controller, etc. in order to actuate valves controlling the flow of any of the gases (e.g., inert gas, oxidizing compounds, purge gas, fuel compounds, reduction products, oxidation products, etc.) entering or exiting the reactor system or any portion thereof. In embodiments, fuel productivity under rapid cycling may be evaluated using, for example, an IR imaging furnace integrated with an off-gas analyzer (mass spectrometer or gas chromatograph).

In embodiments, a wide variety of measurement equipment (e.g., thermocouples for temperature measurement in the reactor walls or other reactor system components, pyrometers for thermal mapping, gas flow meters or controllers, equipment for rapid response mass spectrometry or gas chromatography) may be integrated into the reactor system. For example, product flow compositions or temperatures may be measured, as well as cycle speed, pressures, $H_2O/CO_2$ and inert gas flow rates, and solar thermal power input. Equipment for evaluating reactor thermal characteristics or evaluating the chemical conversion or mechanical or chemical durability over time may be incorporated.

In embodiments, reactor systems include one or more motors (e.g., variable speed) and related control systems to rotate a reactive element or an energy transfer element. Each of the reactive element and the energy transfer element may be supported in any of a wide variety of manners (e.g., with or without bearings, with or without low-friction and/or frictionless surfaces, etc.).

Figure 11:
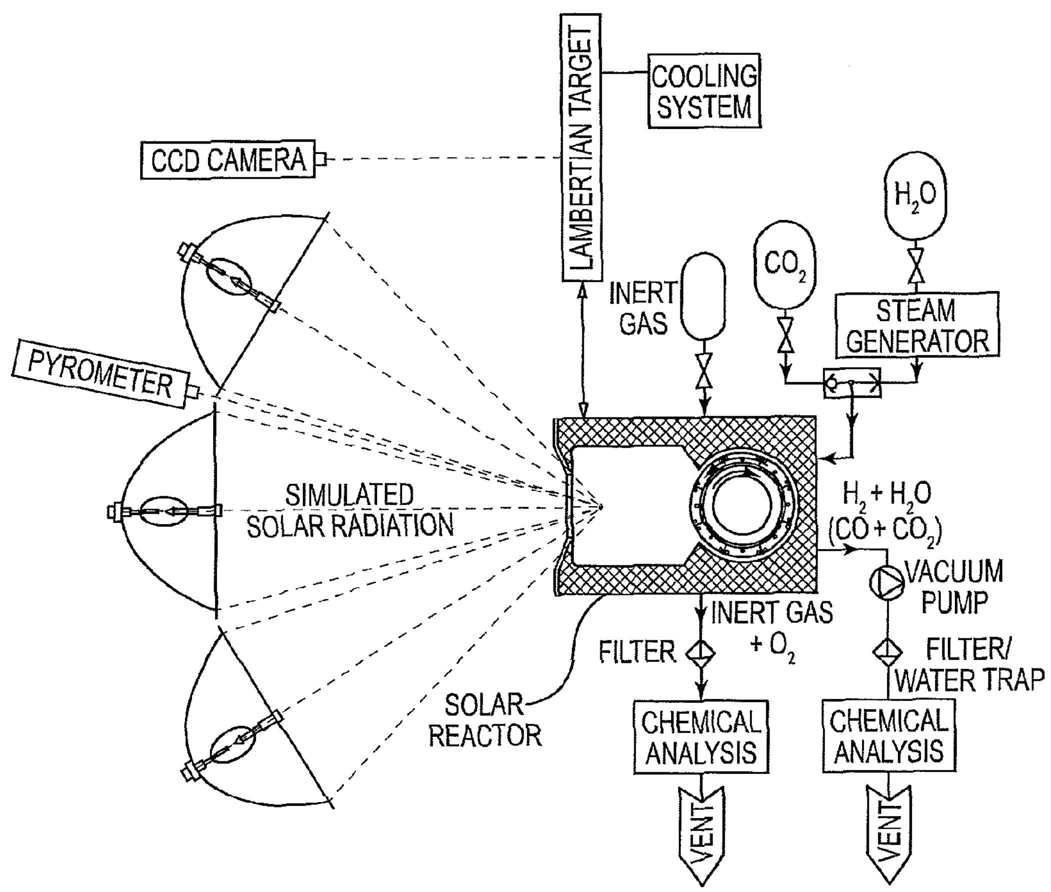
FIG. 11 is a schematic drawing of a reactor system and selected auxiliary components that may be used as a reactor system according to embodiments described herein.

FIG. 11 provides an overview of some auxilary components that may be included in an reactor system described herein.

In embodiments, solar thermochemical reactor systems described herein may be used for improved (e.g., rapid and efficient) production of fuels through utilization of partial redox cycles utilizing metal oxide (e.g., ceria-based) reactive materials. Solar-to-fuel efficiencies of more than 10% may be achieved using such systems. Efficiencies of 10% and higher may be possible with projected but realistic thermal and chemical characteristics of the material components accompanied by highly effective heat recovery between the redox reactions. Such performance may exceed efficiencies of previous demonstrated approaches to solar fuels including both thermal and non-thermal paths.

In embodiments, solar reactor concepts disclosed herein realize complete partial redox cycles in single devices, in which the high-temperature reduction and low-temperature oxidation reactions may be synchronized with continuous heat recuperation, useful to achieve improved efficiency. In embodiments, a reactor designed for a dual-temperature cycle features a directly-irradiated cavity providing uniform high-flux irradiation to a system of concentric reactive and counter-rotating cylinders, allowing for contactless heat transfer and spatial separation of gaseous reaction products. In embodiments, a reactor designed for the approximately isothermal cycle realizes the reduction and oxidation reactions proceeding simultaneously in separate regions contained in a single directly irradiated reactor cavity, while applying high-temperature gas phase heat recovery and maximizing heat transfer between the two reactions. With the concepts described herein, a reactor may be realized, for example, in 5-kW prototypes by thermal-mechanical-optical design guided by numerical models, experimental evaluations in an emulated environment, a high-flux solar simulator, and demonstration on-sun in a parabolic dish.

Use of ceria-based materials may be useful for improved fuel productivity at 1500° C., enhanced solar absorption, and mechanical durability.

In embodiments, an objective is to provide a solar thermochemical reactor for conversion of concentrated solar energy into chemical energy in form of storable and transportable chemical fuels with solar-to-fuel efficiency of about 10% or greater.

Overall efficiency in thermochemical reactors, may be affected by the properties and capabilities of the reactor, such as continuous, cyclic operation, reduction of thermal and radiative losses, as well as increasing heat recovery during cyclic operation.

The shift from stoichiometric to non-stoichiometric redox oxides may represent a materials improvement. A second improvement may lie in one or more new reactor system embodiments for sensible heat recovery that is both effective and suitable to, for example, fragile, porous oxides. Third, a new approximately isothermal cycling reactor may alleviate many of the challenges with current, dual-temperature approaches.

A reactor design may increase efficiency by (1) reducing energy losses (e.g., heat conduction through the reactor wall, re-radiation through the aperture) such that improved material performance can be realized; and (2) enabling solid state heat recovery such that inherent material performance can be improved (e.g., exceeded), particularly for lower temperature cycling.

As discussed above with regard to the dual-temperature designs, a solar reactor may be designed to provide improved levels of solid-state heat recovery under dual-temperature cycling. The designs described above employ a novel heat recuperation strategy to enable highly effective heat transfer between reduced and oxidized metal oxide (e.g., ceria, etc.). Specifically, the reactor designs feature two spatially-separated zones for simultaneous reduction and oxidation with continuous cycling of metal oxide and production of fuel. In the solar or light zone, concentrated solar radiation enters a cavity through a transparent quartz window. The metal oxide, which may be in the form of a hollow rod composed of, for example, sealed reactive chamber elements, each providing an independent chemical environment with embedded permeable gas inlet and outlet ports, rotates into the focal plane at the back-side of the cavity.

As the metal oxide is reduced to the lower valence metal oxide, the reactive material is rotated to the non-irradiated dark zone where fuel production takes place as oxidizing gases sweep through the material. The energy transfer element includes, in various embodiments, a counter-rotating rod (which may or may not be inert) positioned co-axially within the outer active element. As the hot metal oxide (e.g., ceria) rod rotates from the light to the dark zone it loses heat to the transfer element via, for example, radiative heat transfer. The rejected heat may be recuperated as the reactive rod cycles back to the light zone. Highly-reflective high-temperature materials may be applied on the reactor wall surrounding the reactive rod to reduce radiative losses through the outer surface of the reactive rod. The proposed approach for solid heat recovery may provide robust mechanical performance, a challenge encountered in previously proposed cyclic reactors. Engineering models indicate that 80% solid heat recovery may be achieved with this design.

The approximately isothermal cycling reactor described herein provides an interesting means of thermochemical fuel production. With this design, both reduction and oxidation of the oxide (see reactions (1) and (2*a*)/(2*b*) above) are carried out at approximately the same, relatively high temperature and instead the gas phase composition is cycled from inert (or vacuum) to steam (or carbon dioxide). While the metal oxide solid remains essentially at an approximately fixed high temperature during operation, the reactant stream undergoes much more significant heating and cooling than in the dual-temperature case. This design, distinct by, for example, its simplicity, may include a stationary cylindrical cavity of reactive elements containing metal oxide (e.g., ceria, etc.) positioned concentrically within a secondary cavity made out of high-temperature shielded and insulated reactor inert wall to reduce direct-contact heat transfer from metal oxide to the reactor wall. Under the simplified operational conditions, the partial redox cycling may be realized by alternating gas flows through permeable embedded channels. Elements undergoing reduction and oxidation reactions may be intertwined (e.g., alternating) to improve heat transfer between the two cycle steps, and thus effectively recover the enthalpy of the oxidation reaction for the reduction reaction.

According to models, embodiments described herein may provide overall efficiencies greater than 10% at operational temperatures less than 1500° C. at a realistic solar concentration ratio of 3000 suns (data not shown). It is predicted that greater than 10% efficiency at a reduction temperature of 1500° C. ($T_H$) and an oxidation temperature of 800° C. ($T_L$) is achievable (a) with 50% effective solid-state heat recovery and 80% gas heat recovery for the dual-temperature cycle and metal oxides (e.g., ceria), or (b) with 50% effective gas-gas heat recovery for the approximately isothermal cycle (data not shown).

Beyond being both distinct and advantageous relative to conventional thermochemical approaches to solar fuel production, embodiments disclosed herein may be more attractive in comparison to biological or photocatalytic approaches. Because sunlight is used in the form of thermal energy, the entire solar spectrum may be naturally utilized in the process.

In sum, the reactor systems described herein may effectively utilize vast solar resources to produce precursors to synthetic fuels.

In embodiments, a reactor system with a wide variety of fuel production rates are envisioned, depending on the size of the reactive cylindrical element. For example, a fuel productivity of up to 10 mL (STP) of $H_2$ and/or $CO_2$ per gram of reactive metal oxide may be possible given a redox cycle wherein reduction occurs at approximately 1500° C., oxidation occurs at approximately 600° C. cycle, and a total cycle time is approximately 5 min (e.g., up to 0.033 milliliters (STP) of fuel per gram of reactive metal oxide per second). In embodiments wherein the reactive cylindrical element is stationary (e.g., approximately isothermal cycling), fuel production may be, for example, 2 ml $H_2$ per gram of reactive metal oxide given a redox cycle wherein oxidation and reduction occur at approximately 1500° C. and a total cycle time is approximately 2 min.

In embodiments, carbon dioxide may be "reenergized" back into hydrocarbon form using abundant solar energy resources. In embodiments, a solar-driven chemical heat engine may produce a 20 percent solar-to-chemical energy conversion efficiency. For example, the chemical heat engine may cycle redox-active metal oxide structures between reduction and oxidation steps and in this manner recycles carbon dioxide to carbonic oxide (i.e. carbon monoxide), a component of synthesis gas. The engine may use concentrated solar radiation as the source of process heat to drive the highly endothermic reduction step. Reactive structures and an efficient and practical solar-driven chemical heat engine that operates continuously, rapidly cycling between two temperatures in two reaction zones (reduction and oxidation) with spatial separation of the two gas-phase products (oxygen and carbonic oxide) may be useful.

The thermochemical reactors disclosed herein may, in embodiments, convert the energy of photons into chemical bonds to store renewable energy. In embodiments, nonstoichiometric metal oxides such as cerium oxide (ceria) are used to store and release oxygen in response to changes in temperature, with heat being supplied by solar radiation. The stored or released oxygen may be used to produce fuel when coupled with the introduction of appropriate reactant gases. The fuel may be used for any suitable purpose including generation of electricity or fuel cells, for combustion, or the like.

In embodiments, nonstoichiometric oxides are used to enhance reaction kinetics and tune the thermodynamics of the redox reactions. The optimal temperature range for thermochemical reactions may be adjusted by selecting an appropriate nonstoichiometric metal oxide. The use of a given nonstoichiometric metal oxide may alter the desired operating parameters of the reactors and the optimal design of the reactor. In embodiments, transition metal dopants or other substitutional cations are introduced into the nonstoichiometric metaloxide. Such modifications may aid catalysis, enhance solar absorbance, or the like.

In embodiments, the reactive element such as a metal oxide is porous, is disposed on a porous substrate, or the like. Such porous reactive elements provide a high surface area and may enhance reaction kinetics, reduce resistance to gas flow, or the like.

It will be understood that the thermochemical reactors described herein may be used for research purposes, commercial purposes or the like. The reactors described herein may be designed for benchtop experiments or may be readily scaled to working prototypes operated under concentrated solar radiation.

A number of aspects of reactor systems and methods are described herein. A summary of some selected aspects is provided below.

In a first aspect, a thermochemical reactor system includes (i) a carrier having a longitudinal axis and configured to rotate about the longitudinal axis, wherein the carrier defines an opening through at least a portion thereof along the longitudinal axis, (ii) a reactive element, wherein the carrier comprises the reactive element; (iii) an energy transfer element disposed within at least a portion of the opening of the reactive element in a coaxial configuration, wherein the energy transfer element rotates within the opening of the reactive cylindrical element in a direction opposite to the rotation of the carrier; (iv) an inlet gas management system to provide at least an oxidizing compound to the reactive cylindrical element; and (v) an outlet gas management system to receive at least a fuel compound from the reactive cylindrical element.

A second aspect is a system according to the first aspect, wherein the carrier and the energy transfer element are cylindrical.

A third aspect is a system according to the first or second aspect, wherein the reactive element comprises a metal oxide.

A fourth aspect is a system according to the third aspect, wherein the system is configured such that simultaneously (i) at least a first region of the carrier is exposed to radiant energy under conditions sufficient to reduce at least a first portion of the reactive element, and (ii) at least a second portion of the reactive element in at least a second region of the carrier, spatially separated from the first region of the carrier, is contacted with an oxidizing compound under conditions sufficient to chemically oxidize the second portion of the reactive element.

A fifth aspect is a thermochemical reactor system for production of a fuel comprising (i) a carrier having a longitudinal axis and configured to rotate about the longitudinal axis, wherein the carrier defines an opening through at least a portion thereof along the longitudinal axis, and further wherein the carrier comprises one or more segments comprising a gas inlet port and a gas outlet port; (ii) a reactive element, wherein at least one of the one or more segments comprise the reactive element; (iii) an energy transfer element disposed within at least a portion of the opening of the reactive cylindrical element in a coaxial configuration, wherein the energy transfer element rotates within the opening of the carrier; (iv) an inlet gas management system to provide at least an oxidizing compound to the gas inlet port; and (v) an outlet gas management system to receive at least a fuel compound from the gas outlet port.

A sixth aspect is a system according to the fifth aspect, wherein the carrier and the energy transfer element are cylindrical.

A seventh aspect is a system of the fifth or sixth aspect, wherein the reactive element comprises a metal oxide.

An eighth aspect is a system according to the seventh aspect, wherein the reactor system is configured such that simultaneously (i) at least a first region of the carrier is exposed to radiant energy under conditions sufficient to reduce at least a first portion of the reactive element, and (ii) at least a second portion of the reactive element in at least a second region of the carrier, spatially separated from the first region of the carrier, is contacted with an oxidizing compound under conditions sufficient to chemically oxidize the second portion of the reactive element.

A ninth aspect is a system according to any of aspects, 5-8, wherein the carrier comprises a plurality of individually sealed segments, wherein each of the sealed segments comprises at least a portion of the reactive element disposed therein, wherein each segment extends longitudinally parallel to the longitudinal axis and comprises at least one permeable gas inlet port and at least one permeable gas outlet port.

A tenth aspect is a system according to any of aspects 5-9, wherein the gas inlet port comprises an inlet opening defined at least partially through the segment and the gas outlet port comprises an outlet opening defined at least partially through the segment.

An eleventh aspect is a system according to any of aspects 1-10, wherein the carrier and energy transfer element are in a non-contacting configuration.

A twelfth aspect is a system according to any of aspects 1-11, wherein the energy transfer element is capable of heat transfer with the reactive element.

A thirteenth aspect is a system according to any of aspects 1-12, wherein the energy transfer element defines an opening through at least a portion thereof along the longitudinal axis.

A fourteenth aspect is a thermochemical reactor system comprising: (i) a stationary carrier having a longitudinal axis defining an opening through at least a portion thereof along the longitudinal axis, and further wherein the carrier comprises a plurality of segments configured to be exposed to radiant energy through the opening, wherein each segment comprises a gas inlet port and a gas outlet port; (ii) a reactive element, wherein one or more of the plurality of segments of the carrier comprise the reactive element; (iii) an inlet gas management system to provide at least an oxidizing compound to each segment for an oxidation reaction; and (iv) an outlet gas management system to receive at least a fuel compound from each segment. The inlet gas management system may also provide an inert compound to each segment during a reduction step. In addition or alternatively, the gas management system may be configured to provide a vacuum to evacuate the segments during the reaction step.

A fifteenth aspect is a system according to the fourteenth aspect, wherein the carrier comprises a first segment having a first portion of the reactive element and a second segment having a second portion of the reactive element and wherein the reactor system is configured such that simultaneously (i) while the first portion of the reactive element is contacted with an inert compound or being exposed to a vacuum, at least the first segment of the carrier is exposed to radiant energy under conditions sufficient to reduce at least a portion of the first portion of the reactive element, and (ii) at least the second portion of the reactive element is contacted with an oxidizing compound under conditions sufficient to chemically oxidize at least a portion of the second portion of the reactive element.

A sixteenth aspect is a system according to any of the preceding aspects, further comprising a housing, wherein the housing comprises (i) insulation surrounding at least the outer surface of the reactive element; (ii) a reflective radiation shield disposed between the carrier and the insulation; and (iii) a transparent aperture through which the radiant energy may enter the housing.

A seventeenth aspect is a system according to any of the preceding aspects, wherein the carrier, at least in part, is formed from the reactive element.

An eighteenth aspect is a system of according to any of the preceding aspects, wherein the reactive element is porous.

A nineteenth aspect is a system according to any of the preceding aspects, wherein the radiant energy comprises solar energy.

A twentieth aspect is a method of producing a fuel comprising using a system according to any of the preceding aspects.

It should be noted that, unless otherwise noted, features of any embodiment described herein (including the examples) may be combined with any features of any other embodiment described herein.

Various modifications and alterations to this invention will become apparent to those skilled in the art without departing from the scope of this invention. It should be understood that this invention is not intended to be unduly limited by the illustrative embodiments and examples set forth herein and that such examples and embodiments are presented by way of example only.

What is claimed is:

1. A thermochemical reactor system comprising:

a carrier having a longitudinal axis and configured to rotate about the longitudinal axis, wherein the carrier defines an opening through at least a portion thereof along the longitudinal axis;

a reactive element, wherein the carrier comprises the reactive element;

an energy transfer element disposed within at least a portion of the opening of the carrier in a coaxial configuration, wherein the energy transfer element rotates within the opening of the carrier in a direction opposite to the rotation of the carrier;

an inlet gas management system to provide at least an oxidizing compound to the carrier; and an outlet gas management system to receive at least a fuel compound from the carrier.

2. The system of claim 1, wherein the carrier and the energy transfer element are cylindrical.

3. The system of claim 1, wherein the reactive element comprises a metal oxide.

4. The system of claim 3, wherein the system is configured such that simultaneously (i) at least a first region of the carrier is exposed to radiant energy under conditions sufficient to reduce at least a first portion of the reactive element, and (ii) at least a second portion of the reactive element in at least a second region of the carrier, spatially separated from the first region of the carrier, is contacted with an oxidizing compound under conditions sufficient to chemically oxidize the second portion of the reactive element.

5. The system of claim 1, wherein the carrier and energy transfer element are in a non-contacting configuration.

6. The system of claim 1, wherein the energy transfer element is capable of heat transfer with the reactive element.

7. The system of claim 1, wherein the energy transfer element defines an opening through at least a portion thereof along the longitudinal axis.

8. The system of claim 1, further comprising a housing, wherein the housing comprises:

insulation surrounding at least the outer surface of the reactive element;

a reflective radiation shield disposed between the carrier and the insulation; and a transparent aperture through which the radiant energy may enter the housing.

9. The system of claim 1, wherein the carrier, at least in part, is formed from the reactive element.

10. The system of claim 1, wherein the reactive element is porous.

11. The system of claim 1, wherein the radiant energy comprises solar energy.

* * * * *